(12) United States Patent
Kwan

(10) Patent No.: US 7,461,010 B2
(45) Date of Patent: Dec. 2, 2008

(54) COMPUTER NETWORK METHOD FOR CONDUCTING PAYMENT OVER A NETWORK BY DEBITING AND CREDITING TELECOMMUNICATION ACCOUNTS

(76) Inventor: Khai Hee Kwan, 1 Roma Ave., Kensington (AU) 2033

( * ) Notice: Subject to any disclaimer, the term of this patent is extended or adjusted under 35 U.S.C. 154(b) by 979 days.

(21) Appl. No.: 09/827,788

(22) Filed: Apr. 9, 2001

(65) Prior Publication Data

US 2002/0147658 A1 Oct. 10, 2002

Related U.S. Application Data

(63) Continuation-in-part of application No. 09/396,005, filed on Sep. 13, 1999.

(51) Int. Cl.
*G06Q 30/00* (2006.01)
(52) U.S. Cl. .......................... 705/26; 705/39
(58) Field of Classification Search ............ 379/144.01; 705/1, 17, 26, 25, 51, 27
See application file for complete search history.

(56) References Cited

U.S. PATENT DOCUMENTS 5,845,267 A * 12/1998 Ronen ........................ 705/40
5,991,749 A * 11/1999 Morrill, Jr. .................... 705/44
6,249,770 B1 * 6/2001 Erwin et al. .................. 705/10
6,424,706 B1 * 7/2002 Katz et al. ............. 379/144.01
6,487,540 B1 * 11/2002 Smith et al. ................... 705/21
6,560,581 B1 * 5/2003 Fox et al. ...................... 705/51
6,934,858 B2 * 8/2005 Woodhill ....................... 726/5
7,051,001 B1 * 5/2006 Slater .......................... 705/39
2001/0001321 A1 * 5/2001 Resnick et al. ................ 705/17

OTHER PUBLICATIONS

No Author, "Banks Ponder The Power Of New Internet Gadgets", Bank Technology News, Feb. 1999. Retrieved from Dialog File 16, Acc#:06171132.*

* cited by examiner

*Primary Examiner*—Naeem Haq

(57) ABSTRACT

A computer network method for conducting payment over a network by crediting and debiting telecommunication accounts. The computer network includes a computer connected to the Internet, which performs the following functions: (1) receiving a payment request from a prospective payer; (2) confirming the request and assigning an unique transaction identifier; (3) receiving an electronic authority from the payer's telecommunication service computer indicating whether or not such request has been approved; (4) crediting and debiting payer's and payee's telecommunication accounts with their respective telecommunication service providers and (5) confirming this transaction by responding a receipt to the payer's mobile device and to payee's server.

21 Claims, 4 Drawing Sheets

COMPUTER NETWORK METHOD FOR CONDUCTING PAYMENT OVER A NETWORK BY DEBITING AND CREDITING TELECOMMUNICATION ACCOUNTS

CROSS-REFERENCE TO RELATED APPLICATIONS

This invention is related and a continuation in part to U.S. application Ser. No. 09/396,005 (Application Number) having US Date of filing Sep. 13, 1999 with the title "Method, apparatus and program to make payment in any currencies through a communication network system using pre-paid cards" by the same inventor, herein incorporated by reference in its entirety. Application Ser. No. 09/396,005 is currently pending and also claims the benefit of Australia Application AU 199943506 A1 with filing date Aug. 11, 1999.

STATEMENT REGARDING FEDERAL SPONSORED RESEARCH OR DEVELOPMENT

Not Applicable

REFERENCE TO A MICROFICHE APPENDIX

Not Applicable

FIELD OF THE INVENTION

The present invention relates to methods for making payments for the purchase of goods or services over a network such as the Internet by crediting and debiting telecommunication accounts belonging to the seller and buyer respectively. Specifically, the invention provides for receiving payments as credits in a telecommunication account including means, at merchant point-of-sale locations such as web site, and includes means for debiting a payer's telecommunication account in response to the payment. The user's wireless communication device is used as the means to confirm, authenticate and validating the transaction. A central processor or payment processor is provided to facilitate the process.

BACKGROUND OF THE INVENTION

The present invention relates to methods of using a cellular phone or other wireless communication device communicating with a payment processor to confirm, authorise purchases over the Internet and provide a simple verification of the valid purchase. The purchase cost is debited from the buyer's pre-paid account with the telecommunication provider or in the case of non prepaid buyers, accrued as a payable item on their monthly telecommunication statement. This same purchase amount is then credited to the payee's telecommunication account. There is no transfer of funds from any accounts either from a financial institution or otherwise. Merchants receiving payment will have their own telecommunication credits in dollars recorded in their statements and the payer will have the telecommunication debits recorded for non prepaid accounts to be settled later according to the terms as set by the telecommunication provider. Other terms such as a ceiling of max purchase cost may be set. This invention is primarily designed for small value items.

Prior to the present invention, cellular phones and/or other wireless communication devices have been used in a variety of different procedures involving the transfer of funds between different accounts involving financial institutions and different accounts. These procedures leave something to be desired in that they are unduly complicated and less convenient and/or less secure and costly.

SUMMARY OF THE INVENTION

The present invention avoids the failings of the prior art by providing methods which are highly reliable and simple to follow using existing technology. The main advantage here is that no funds is physically being transferred from one physical account or another and purchases are either billed by the telecommunication provider or alternatively debited directly if it is a prepaid account. And in both cases they are merely book entries into the accounts with the telecommunication providers. Money paid will be in the form of credits to the receiver or merchant as the case may be which is either in the form of telecommunication service credits or a direct cash pay out. Having it within the telecommunication accounting system and bill means little or no changes to existing accounting requirements.

In accordance with the present invention, a method is used to purchase goods or services over the Internet and where such purchase is debited into the mobile phone owner's account and the receiver/merchant's account is credited with the amount less a fee. This invention includes confirmation, authorisation and to provide validation of the purchase on presentation. The final step is particularly important for services where the buyer needs to present proof of purchase in order to receive on the spot service purchase such as tickets.

The method of crediting and debiting between different telecommunication accounts within the same telecommunication service provider comprising the steps of expanding the function of a service provider's central processing unit to include account and authorization information, generating a function code over the net to the user, requesting user to re-enter the function code provided on the keypad of a cellular phone or other wireless communication device or by voice, sending the function code to the central processing unit of the provider which identifies the desired transaction and the payer and payee, determining at the central processing unit whether a personal identification number is needed, and supplying the central processing unit with the personal identification number where this personal identification number can be keyed in or spoken on the cellular phone, upon confirmation of the identity of the payer either by the personal identification number or by voice patterns, authorizing the desired transaction, determining the different accounts involved in the transaction, making a debit entry to the payer's account, making a credit entry to payee's account and confirming completion of the transaction.

The method includes the steps of expanding the function of a service provider's central processing unit such as the telecommunication carrier to include user sub account.

The method of crediting and debiting between different telecommunication accounts with two different telecommunication providers comprising the steps of expanding the function of a telecommunication service provider's central processing unit to include account and authorization information. A separate payment processor linked to participating telecommunication providers is used to generate a function code over the net to the user, requesting user to re-enter the function code provided on the keypad of a cellular phone or other wireless communication device or by voice, sending the function code to the payment processor unit which identifies the desired transaction and the payer and payee. Determining at the payment processing unit whether a personal identification number is needed, and supplying the central processing unit at the payer's telecommunication with the personal identification number where this personal identification number can be keyed in or spoken on the cellular phone. Upon confirmation of the identity of the payer either by the personal identification number or by voice patterns by the central processing unit at the buyer's telecommunication carrier, payment processor will authorize the desired transaction, determining the different accounts involved in the transaction, further instructing a debit entry to the payer's account with the first telecommunication carrier, instructing a credit entry to payee's account with the second telecommunication carrier and confirming completion of the transaction with both payer and payee.

Preferably, the method includes the step of initiating a purchase over the Internet by entering the mobile phone number as the identifying account to be debited. This step is similar to using credit card but instead of the credit card number, a phone number is used instead. Upon confirmation of such an account, the service provider will issue an activation code over the net to the user's web browser where such activation code is use to confirm the purchase. The carrier or service provider will initiate a purchase call to the owner of the mobile phone as per the mobile phone number provided. This step can be substitute by the user calling the carrier instead if required. Having connected to the telecommunication carrier, the user will enter first the activation code as shown on the web page to confirm the purchase. This code must be spoken directly to the mobile phone where the voice pattern of the user of the mobile phone is compared with the stored voice pattern stored in the sub account or key in on the mobile phone keypad if user has selected this option. This is followed by an authorisation query where the user/purchaser will need to response by entering his or her password which is earlier set on opening the purchase telecommunication sub account. This password can be keyed in or by using the voice protocol as mentioned above. Upon receiving and verifying the authorisation code the carrier will check for available credits in the account in the case of a prepaid account holder. In the case of a non prepaid account holder, the purchase cost will be entered and included as part of the user's monthly phone bill invoice to be paid. A credit book entry amounting to the cost of the purchase less a fee will also be made to the payee's telecommunication sub account. A confirmation receipt is then sent to the mobile phone as a short message service (SMS) where such receipt is encrypted with information about the purchase and purchase identification or other relevant data such as time of purchase as determined by the payment processor. In addition, upon completion of the transaction the merchant's server will receive an encrypted receipt from the payment processor where such receipt is stored as a record for validation if required. For validation purposes, the user will download this stored message to the buyer's or merchant's server using an coupling device suitable for this means. Both messages will be compared by the merchant's server.

In case of a dispute, the user or payer can resent this encrypted message to the payment processor to be decrypted and the payment processor will either confirm or denied such message and sent the results to both user's mobile phone and merchant's server.

BRIEF DESCRIPTION OF THE DRAWINGS

The foregoing aspects and the attendant advantages of this invention will become more readily appreciated through reference to the following detailed description, when read and considered in conjunction with the accompanying drawings, wherein.

DETAILED DESCRIPTION OF A PREFERRED EMBODIMENT

Figure 1:
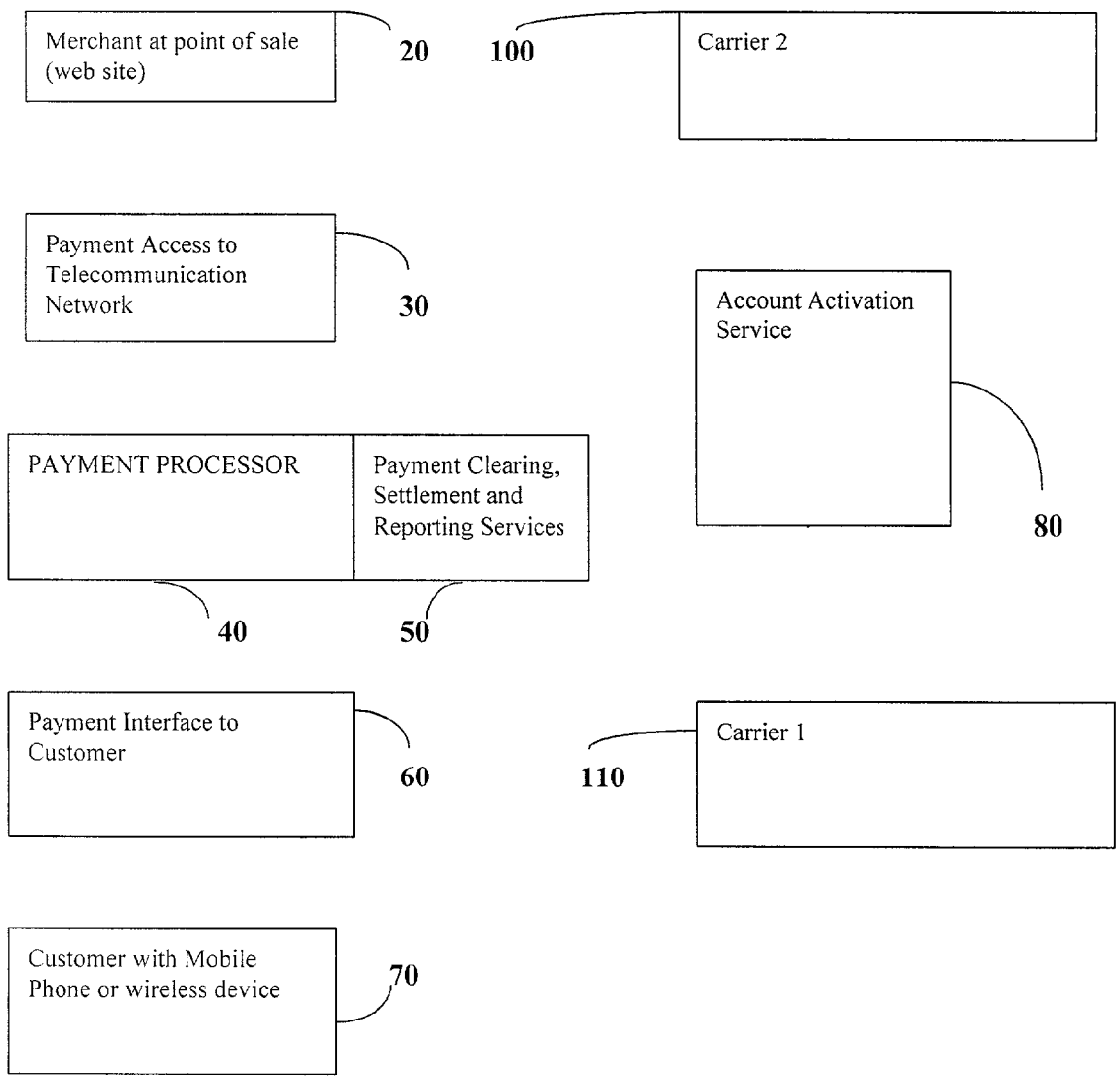
FIG. 1 is a block diagram introducing the various components involved in the system and methods of the present invention.

FIG. 1 illustrates the principle components of a system and methods according to the present invention to provide payment for the purchase of goods and services over the internet by debiting and crediting the payment amount sought in telecommunication carrier accounts from two separate carriers. Referring to FIG. 1, a customer 70 with a mobile phone or wireless device represents a person who has established one or more payment accounts linked to their telecommunication account with at least one provider according the invention. Customer 70 is illustrated as having a mobile device and visiting at a point-of-sale. A point-of-sale can be a conventional "brick and mortar" retail merchant location, such as a store or restaurant or a vending machine having a link to the Internet through a communication device with display monitor. A point-of-sale for present purposes can also be a kiosk, touch-screen or other data terminal as further described herein at any location accessible to users as long as they are linked at least by a telecommunication network. In FIG. 1, for the sake of simplicity, the point of sale is a web site in a web server connected to the internet network.

In FIG. 1, the merchant 20 refers generically to the proprietor of a point-of-sale establishment or payee, such as a web site on the Internet example; www.amazon.com. According to the present invention, as further described later, the customer 70 is connected to this web site by requesting its Universal Resource Locator (URL) over the Internet from a terminal using a program such as known as a browser and intends to purchase a particular item and this intention is transmitted to the payment processor 40 by a hyperlink such as http://www.paymentel.com/merchant/XYZ.asp?merchantid=1234567&itemid=12342&ran=12342sd, generated by scripts such as CGI or ASP residing on the merchant server 20.

Where "merchantid" represents the id of the merchant, "itemid" represents the item the purchaser wish to purchase and the cost by "ran" which are all encrypted. Other variables may be included depending on the system requirements.

The heart of the present system is a payment processor 40, which can be conveniently implemented on a suitable general purpose digital computer programmed as explained in greater detail later and connected to the network linking the participants. The principle features and functions of the payment processor, each of which will be described in greater detail in turn, include a means 30 for accessing an existing telecommunication network to communicate transaction data; payment interface to customer 60; payment clearing, settlement and reporting services 50 and carriers 100/110. It is important to note that this payment processor 40 may be coupled with or as part of an extension of at least one telecommunication carrier main central processor rather than as an individual entity as depicted here. The reasons for a single external entity here is to illustrated the separation of functions between the central processor at payer's carrier and payment processor. This is crucial for accountability particularly in a payment transaction which requires a third party to reconcile the accounts.

It is critical to note that in this application, the customer 70 is an individual (or business) who is currently utilizing goods or services provided by at least one telecommunication carrier 110/100. The user's account for the purposes of making payment from, which we also refer to as the sub account, is maintained by the wireless carrier 110 on a prepaid platform or non prepaid such as an accrual platform where the customer 70 is billed on a periodical basis. The system is intended to serve the needs of multiple merchants (each of which has its own universe of end-users as well as the payment gateway for their respective carriers). One important feature of the present system is that the customer 70 must already have an existing account with their respective carriers prior to using this service and the target merchant must agree as the counter party of this service since payment in the form of monetary credits will be accrued into their telecommunication account. With this telecommunication account, they will be able to set up a sub account using account activation service 80. The sub account is a "virtual" account separating entries between real telecommunication cost and other transactions as authorised by the payer under terms with the service provider and is consolidated with the main telecommunication account for billing purposes. The telecommunication service provider may provide limits on this sub account. This sub account also contained authorisation data to gain access. It is therefore necessary that payer and payee involved in the transaction to have telecommunication accounts with at least one participating carrier and subsequently open an sub account. The payment processor 40 maintains a database of the transactions and respective account holders, each of which is "associated" with a corresponding carrier's user account, as further explained below. This is purely for record keeping and for profiling the users. This database do not have any relevant information such as passwords or voice patterns required to authenticate the transaction which are held with their respective carriers as it should be.

Figure 2:
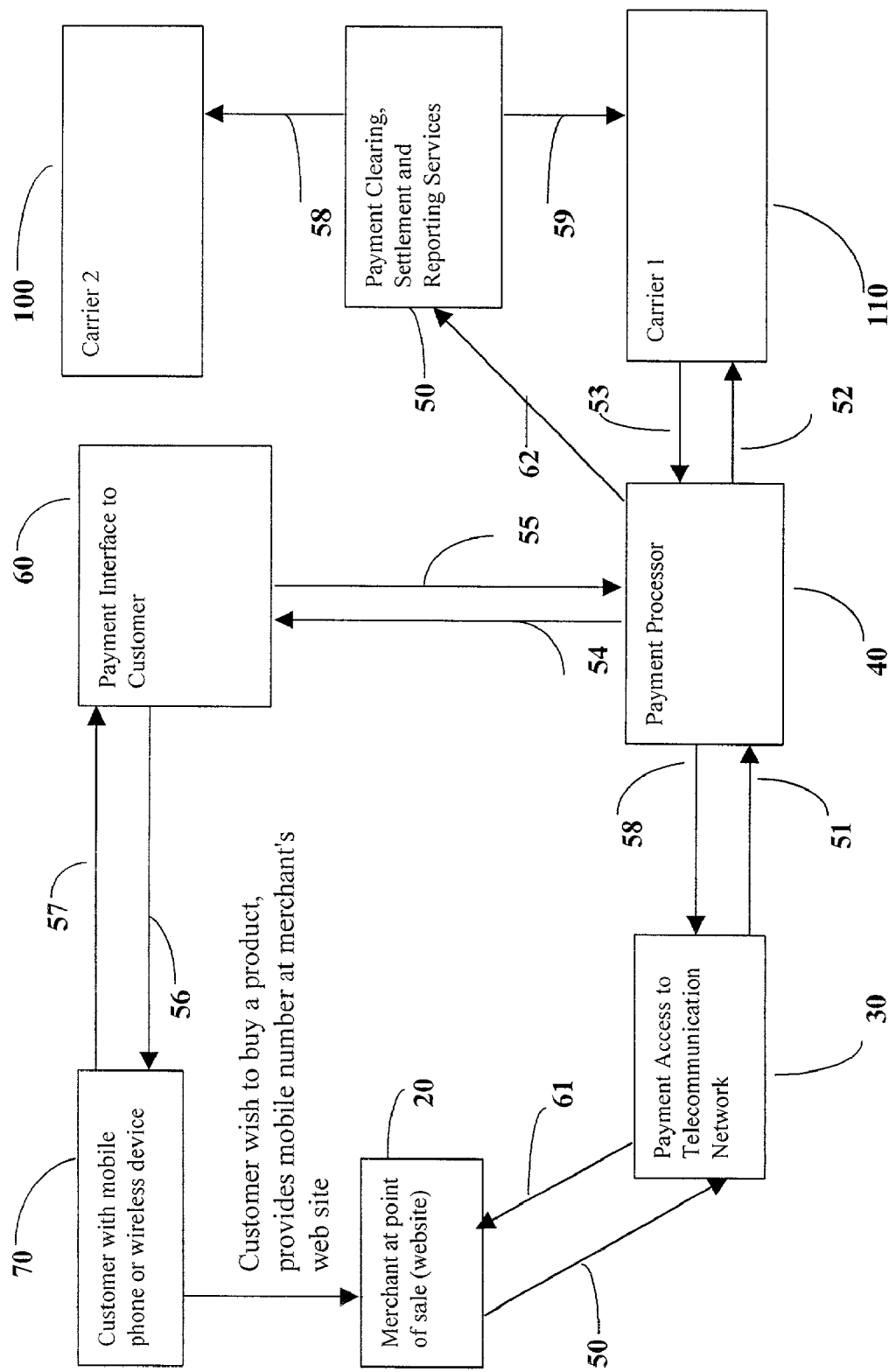
FIG. 2 is a flow chart illustrating a method for processing the payment transaction of a payer account maintained on a prepaid platform, utilizing an payment processor system according to the invention.

FIG. 2 is a flow chart illustrating the basic method for processing a payment transaction to purchase a product from a web merchant where the payer account is maintained on a prepaid platform with Carrier 1 (110). In this example, the web merchant has an account with Carrier 2 (100) and both carriers are parties to this payment service. To illustrated this further, we have separated the payment processor 40 as an independent hosted server providing the payment services but it is recognised that the payment processor can be integrated with at least one of the carrier and service as many other carriers participating in this arrangement. The main reason for this separation is an administrative rather than a technical one.

We have also applied an prepaid account for customer 70 where such account is held with Carrier 1 (110) while the merchant 20 has an non-prepaid account where such account is held with Carrier 2 (100). The prepaid mobile phone user/customer 70 visits a merchant at point-of-sale 20 using his browser program from his terminal over the Internet. The customer 70 indicates he wants to make a purchase or make payment at the web site by clicking a hyper link text on the web page residing on the merchant's server over the Internet through connection 50. As mentioned previously, when the payer click on the hyperlink linking to the payment processor via the web site 20, the unique identification of the merchant, cost and other relevant data are communicated through connection 51 via a telecommunication network 30 to the payment processor 40 where upon the payment processor replies in the form of a web page on its web server to the payer's browser and requesting for payer's mobile phone number.

In the same communication, the payment processor also sent a random generated number (also known as transaction number) to associate this transaction to customer 70 within the same web page. The payment processor will initiate the necessary sequence to authenticate the customer 70 as well as to check the merchant's details are valid prior to generating the random number to associate this transaction in its database. It should be appreciated, the initial step to establish contact with the payment processor varies from different point of sale as we shall see later. On receiving the mobile phone number from the customer 70, payment processor will contact the carrier where the customer has provided the account with, in this case carrier 1 (110). Payment Processor 40 will query Carrier 1 (110) whether this account exists in their customer database and if it is a prepaid account to also verify if enough funds are current to pay for the goods through connection 52. Payment processor may also query if there is any special limitations to this account where such limitations are pre set by the carrier's main processor. If carrier 1 replies with affirmative to both queries, Payment Processor 40 will then communicate through connection 54 & 56 with the customer using the payment interface to customer 60 by calling and connecting to the provided mobile number sent by the customer 70. Alternatively, the customer 70 may call the payment processor 40 if a number is provided being routed through the payment interface to customer 60. This stage of the process is generally refers to transaction confirmation. This transaction is performed when the customer 70 is asked to provide the random number generated earlier as shown in the web page and is required to associate the transaction with the payment system (transaction) account number at the payment processor 40. This transaction can be managed by either an interactive voice response (IVR) application that is running on a voice response unit (VRU) or through a live customer care representative. Typically this transaction will occur only at the beginning of the call and if the requested number entered is in error after a number of tries, the call will be terminated and the caller number recorded. The requested transaction number is keyed in on the key-pad of the mobile phone or by speech through connection 57 where another program such as a voice recognition software at 60 will decipher the results and passed it through connection 55 to Payment Processor 40 for processing.

Provided the payment processor 40 can confirm the transaction exist and good, then is followed by the authentication stage where the payment processor is required to authenticate the customer 70 as the legitimate account holder before able to process the payment. Payment Processor 40 commenced by either requesting for a password or as the case may be to authenticate the user's voice pattern using payment interface to customer 60.

On receiving the data from connection 55, payment processor 40 will interrogate Carrier 1 (110) about the account holder and the password provided. These data are kept at the Carrier's database at the time the sub account is established using account activation service 80 (not shown in FIG. 2). The main reason for keeping these data with their respective carrier is that each carrier may have a different accounting system to track their customers' credit status in real time. Only carriers will have the latest detail of their customers in real time. If the data such as the password is keyed in and sent by the customer 70 is verified by carrier and provided there are sufficient funds for a prepaid user, then Carrier 1 will send a good response to Payment Processor 40. If both password and voice pattern are required, then the customer 70 need to speak the password into the mobile phone for verification.

Once a good response is received from Carrier 1 (110), payment processor 40 will through Payment Clearing, Settlement and Reporting Services 50 instructs carrier 1 (110) to deduct the amount from the customer's prepaid account in real time and at the same time instruct Carrier 2 (100) where the merchant's telecommunication sub account is held to credit the account with the same amount deducted from customer's account at carrier 1 (110) less a service fee.

For a payer having an accrual account, in reality there is no actual "deduction" taking place since this are actually book entries into the sub account. The amount owed is accrued as like a real telecommunication charge but maintained separately in a sub account. To explain, this is similar to a provisional account (for bad debts) in accounting terminology where provisions are made 'ready' to be deducted on realisation. For a prepaid account the debit in the sub account is realised straightaway.

This credit connection 58 and debit connection 59 are performed by Payment Clearing, Settlement and Reporting Services 50 through connection 62 and controlled by Payment Processor 40.

On completion as confirmed by 50, Payment Processor 40 confirms again by sending an electronic receipt to Merchant 20 using connection 58 and 61 and to Customer 70 using connections 54 and 56 in the form of a short message text. On receiving this receipt, Merchant 20 is obligated to release the goods or services as ordered by the customer 70 in order to conclude this purchase transaction.

On completion as confirmed by carrier 100/110 and earlier by Payment Clearing, Settlement and Reporting Services 50, Payment Processor 40 will record this transaction as settled in its database.

Where the response from payer's carrier is bad such that the password is not verified or insufficient funds, payment processor 40 will sent a negative message to the merchant 20 and terminated the connections. All messages sent are encrypted.

Figure 3:
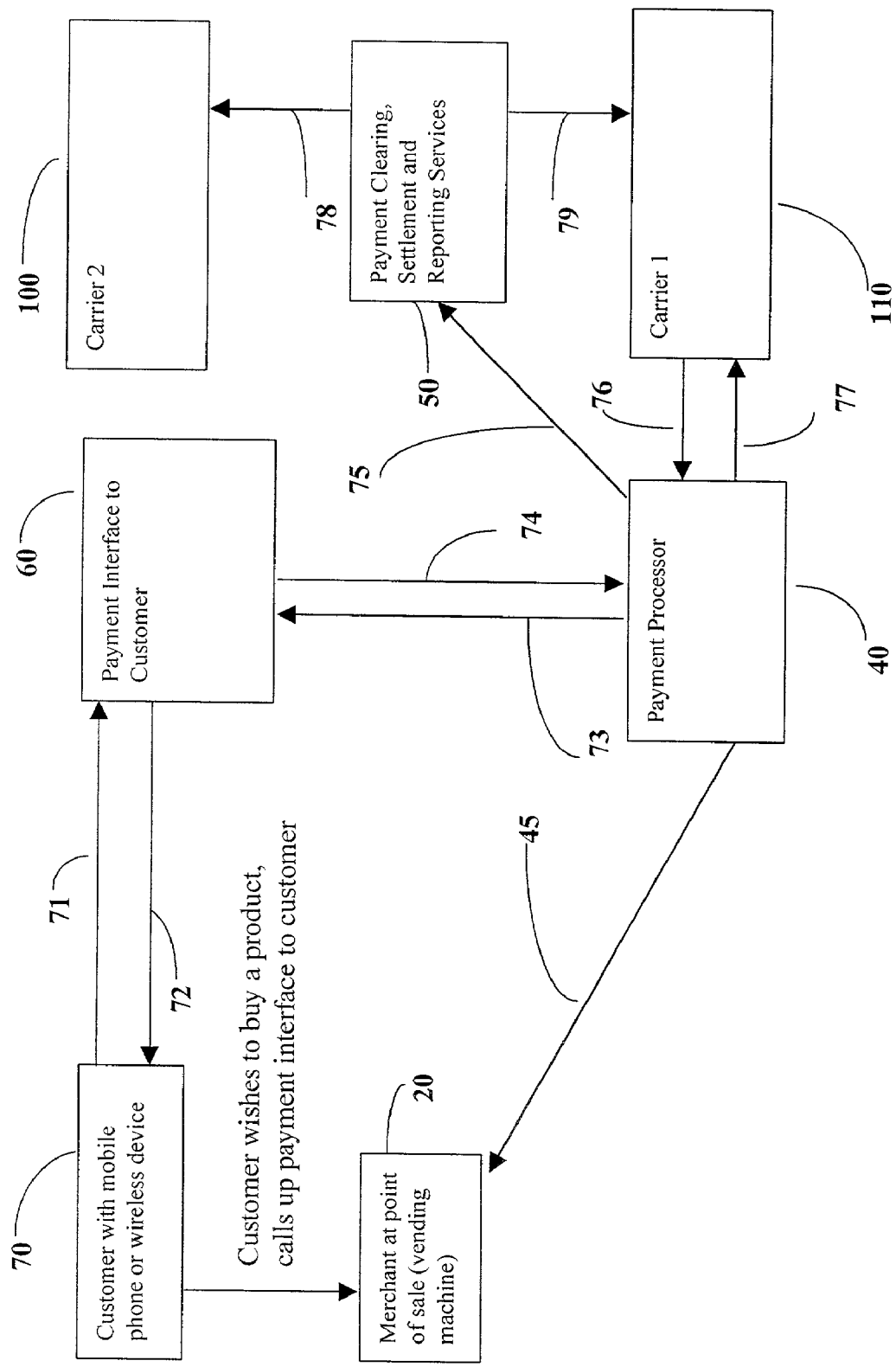
FIG. 3 is a flow chart illustrating a method for processing the payment transaction of a payer account maintained on a prepaid platform where the point of sale is a vending machine, utilizing an payment processor system according to the invention.

Referring to FIG. 3, in the case of a vending machine where there is no display screen or data terminal, the customer 70 indicates his willingness to purchase a product from the vending machine by ringing a special number shown on the vending machine where this number is linked directly to Payment Processor 40 through an interactive voice response interface programmed into 60. The special number called by the customer 70 provides the payment processor 40 with the identity of the vending machine and since the call was made from the customer's mobile phone, the mobile phone's number is captured at the same time to provide the payment processor to the user's account and the respective carrier that the user is currently with. To identify the goods and amount data, customer is asked, when prompted, to key in the number under the displayed goods in the vending machine on connecting to Payment Interface to Customer 60. For example, a can of Coca-Cola may have the number 123456# and for 1 can, 1 # etc. To begin, Customer 70 call up Payment Interface to customer 60 and sent data at connections 71, 74 to payment processor to record the transaction where upon, Payment Processor 40 sent the details through connection 77 of the customer 70 to Carrier 1 (110) to check the sub account holder's status to ensure sufficient funds are available assuming that this is a prepaid account. If this is good, Carrier 1 (110) will response to payment processor 40 through connection 76 and follow by payment processor 40 initiating a request for authentication usually a password through connection 73. Payment Interface to customer 60 will prompt customer 70 by either keying in the password or by voice depending on the option chosen through connection 72. Upon receiving the authentication data from customer 70 through connection 71 and 74, a request 77 is sent to Carrier 1 (110) to verify the password sent by the customer 70 from payment processor 40 . If it is good, Payment Processor will then instruct through connection 75 to Payment Clearing, Settlement and Reporting Services 50 to debit the account in Carrier 1 (110) by the amount sought through connection 79 and credit the same amount less a fee through connection 78 at Carrier 2 (100) which is representing the merchant's account. As a rule, this amount is never the same as the amount of the payment made by customer 70 to the merchant, depending upon various fees, discounts, or promotional programs that may apply. All of these considerations and options can be taken into account through suitable programming in the processor 40. Once this process is completed, Payment Processor 40 will sent a good approval message to the vending machine 20 to release the good purchase through connection 45.

The payment processor 40 preferably is coupled to all the participants, via a high bandwidth data communications link, such as frame relay connection, to minimize delay.

Figure 4:
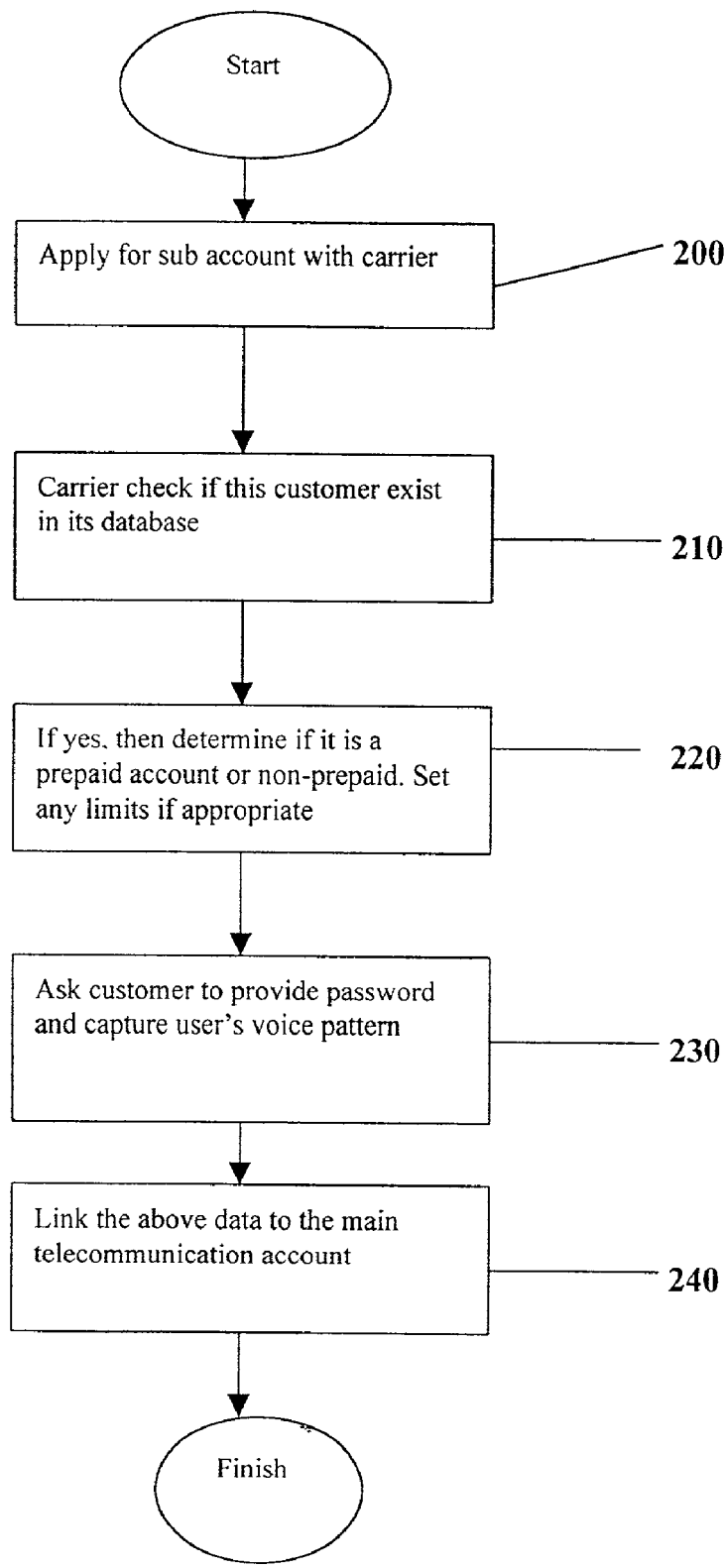
FIG. 4 is a flow chart illustrating a method for activating a sub account with a telecommunication carrier.

FIG. 4 is a flow chart illustrating methods for establishing the sub account with the carrier. This application is required in order to activate the customer 70's sub account with the carrier by associating this account with their main telecommunication account. In this invention, we have coupled service 80 with various carriers' main processor.

To begin, the customer need to have an existing telecommunication account and contacts the Account activation service 80 at their respective carrier which can be implemented on the carrier (100 & 110) systems or on another platform such as the payment processor 40 so long that it can communicate with the carrier's processor or system. This account activation service 80 can be implemented using interactive voice response technology, which is commercially available. On receiving a request from a customer usually by a mobile phone connection 200, the account activation service 80 communicates with the carrier's main database to confirm 210 that the main telecommunication account is valid and in good standing 220. This is followed by requiring the user to provide a password or/and a voice pattern by speaking a number of words 230. This are recorded and confirmed by 80 and a sub account is created within the carrier's database system associating the password and voice pattern 240. Similarly for the Merchant 20 if they want to use their telecommunication accounts, they must go through the same process as the customer 70 above. Below is a description of each of the transaction types and the payment processing that is associated with them.

1. Account crediting. Account crediting is a transaction which provides a credit entry amounting to the payment value in the payee's sub account as recorded at the customer database with their respective telecommunication carrier less a fee. Upon receipt of an account crediting transaction, the payment clearing, settlement and reporting services 50 performs a series of verifications to determine if the transaction is valid. These verifications can include, for example, authentication of payment transaction, ensure that a corresponding account debit has been recorded, identification of the payment account with the target telecommunication carrier, assessing transactional velocity and limits, validation of merchant, and detection of duplicate transactions. If the transaction passes the validation checks then the payment clearing, settlement and reporting services 50 prepares the transaction for remote processing at the payee's carrier processor. The payment processor 40 identifies and verifies the payee, the payee's carrier, and the sub account number based on the payment transaction number and receives a confirmation from payment clearing, settlement and reporting services 50 when this transaction is passed to the carrier.

2. Account debiting. Account debiting is a transaction which provides a debit entry of the payment value in the payer's sub account at the customer database with the payer telecommunication carrier less a fee. Upon receipt of an account debiting transaction, the payment clearing, settlement and reporting services 50 performs a series of verifications to determine if the transaction is valid.

Payment Clearing, settlement and Reporting Services 50 upon instruction from payment processor 40 prepares the transaction for remote processing at the payer's carrier processor and records this transaction as completed. The payment processor 40 identifies the payer, the payer's carrier, and the sub account number based on the mobile phone number and subsequently created payment transaction number. At completion of both Account Debit and Credit with confirmation from Payment Clearing, settlement and Reporting Services 50, Payment Processor 40 will return a receipt to merchant 20 and payer 70.

3. Account authentication. Account authentication is a transaction to verify that the payer's account number (e.g. a cell phone number) exists in the customer database, a sub account linking to the main telecommunication account for payment or receiving payment and the proper authority of the payer by verifying the password or voice patterns linked to the account. This transaction is performed when the payer's account number is being associated with the payment system transaction number ready for payment. This transaction is managed remotely by payment processor 40 querying the payer's telecommunication carrier in regards to the above information or other pre-programmable information such as account limit or purchase limit etc and to receive a good or bad response from carrier's main processor.

Communications

Referring again to FIG. 2, the connection between the payment system (processor 40) and the merchant (point of sale) 20, telecommunication carriers (100, 110), Customer 70 can be a Frame Relay network or some other secure link, in a presently preferred embodiment, although various communications hardware and protocols can be used. The communications protocol over which the transaction message will be transmitted to and from the payment system to all parties can be, for example VOIP, TCP/IP or WAP.

Processing the Transaction at the Carrier

Each transaction type is processed in a different way. Once the transaction type is identified, the processing that is likely to occur is described below.

1. Account Validation. Lookup the customer's account based on the customer account number. Log the transaction. Respond to the payment processor.

2. Account Authentication. Lookup the user's previously stored password or voice pattern and matched it against the data sent by customer. Perform validation checks such as credit limitation, prepaid account amount etc. Log the transaction. Respond to payment processor.

3. Account Debiting. Upon receiving instruction from Payment Clearing, Settlement and Reporting Services 50, lookup the user's account and add payment to non-prepaid account or deduct amount from a prepaid account. Log the transaction. Respond to payment processor.

4. Account crediting. Upon receiving instruction from Payment Clearing, Settlement and Reporting Services 50, lookup the payee's account and add amount paid by payer as credit entry in the sub account. Log the transaction. Respond to payment processor.

Settlement and Clearing

In Payment, Clearing, Settlement and Reporting Services 50, upon receiving payment transaction instruction from payment processor 40, means to contact the respective carrier's main processor to provide payment details directly. On receiving conformation from the respective carriers directly to payment processor, the payment transaction is logged in the payment processor 40 database. It is important to note that each transaction sent to Payment, Clearing, Settlement and Reporting Services 50 must be matched with a corresponding confirmation from the carrier to be considered settled otherwise it is known as "clear" but not "settled" in this invention. The risk that the payer will not settle in the ordinary sense with the telecommunication service provider is not a concern of this method. At the end of the processing day, the payment processor aggregates all of the payment transactions for the day based on merchant and customers into the database. The payment processor system performs various accounting functions.

Reporting Functions

A payment reporting services provide daily activities summaries to its customer, telecommunication carriers and merchant, and can also provide periodic activity and financial summaries for a fee. Each carrier will then reconcile with this statement. Finally, reporting services can provide real-time activity summaries to the wireless carriers prepaid platform on demand. All parties can individually access the Payment Processor's reporting services over its web server using their browser program to log in to check details. Users need to register for this service.

Marketing and Profiling

Given the amount of data collected by the payment processor about the users, a marketing and profiling system exists to analyse the purchasing patterns of the users and provide the results to marketing companies for a fee. Users may wish to be excluded from being a statistics by paying an opt out fee.

It should be apparent to one of skill in the art that the method of the present invention can be used for other payment requirements by crediting telecommunication accounts of parties to the transactions for small items that may be too expensive for financial institutions to manage.

The invention claimed is:

1. A computer readable storage medium storing instructions that, when executed by a computer to perform a method for payment or fund transfer transactions, the method comprising:
providing at least a centralized payment processor linked to networks connecting to at least a telecommunication carrier provider's server having telecommunication accounts and corresponding account identifiers;
providing a wireless communication device;

the payment processor receiving at least a transfer amount, a payee's account identifier upon initiation of a transaction over a first network from payer;

the payment processor receiving at least a payer's account identifier from said payer;

the payment processor receiving at least a password from said payer;

the payment processor transmitting said payer's account identifier, said password and said amount to said payer's telecommunication carrier provider for authentication;

the payment processor transmitting said payee's account identifier to said payee's telecommunication carrier provider for authentication;

if said authentications are both approved, includes a further step by the payment processor transmitting to said payer's carrier provider to record a debit entry for said transfer amount in said payer's account and transmitting to said payee's carrier provider to record a credit entry for same for said payee's account; and whereby said payment processor is a single point of contact to process transactions between payer and payee having accounts with different telecommunication carrier providers without said providers communicating with each other over said networks.

2. According to claim of 1 whereby said transfer amount and said payee's account identifier is a code sent to payment processor to identify transaction and payee.

3. According to claim 1 further includes computer readable instructions to perform, after said authentication step is approved, the method comprising the payer's wireless communication device receiving from said payee at least one of the following selected from a group consisting: a receipt evidencing said transfer amount, digital goods and a receipt for services over a wireless network.

4. According to claim 3, further includes computer readable instructions performing the method for receiving goods and services comprising:

providing on-site point of sale terminal;

receiving said receipt from said payer's wireless communication device to said terminal for verification; and if verified then receiving goods or services from said payee.

5. According to claim of 1 wherein the step of receiving at least a password from said payer, further includes computer readable instructions to perform the method comprising:

the payment processor establishing a connection with said payer over a second network different as compared to the first network; and whereby at least one of said networks is a wireless network.

6. According to claim 1 further includes computer readable instructions to perform the method comprising:

providing a prepaid card; and wherein the payer's telecommunication account is a prepaid account, includes a further step of verifying the availability of prepaid funds satisfying said amount.

7. According to claim 1 further includes computer readable instructions for user to establish sub account at said telecommunication carrier provider's server having corresponding account identifier to the main telecommunication account.

8. A payment system comprising:

a wireless communication device;

at least a centralized payment processor linked to networks connecting to at least a telecommunication carrier provider's server having telecommunication accounts and corresponding account identifiers;

said payment processor having computer readable instructions to perform the method comprising:

the payment processor receiving at least a transfer amount, a payee's account identifier upon initiation of a transaction over a first network from payer;

the payment processor receiving at least a payer's account identifier from said payer;

the payment processor receiving at least a password from said payer;

the payment processor transmitting said payer's account identifier, said password and said amount to said payer's telecommunication carrier provider for authentication;

the payment processor transmitting said payee's account identifier to said payee's telecommunication carrier provider for authentication;

if said authentications are both approved, includes a further step by the payment processor transmitting to said payer's carrier provider to record a debit entry for said transfer amount in said payer's account and transmitting to said payee's carrier provider to record a credit entry for same for said payee's account; and whereby said payment processor is a single point of contact to process transactions between payer and payee having accounts with different telecommunication carrier providers without said providers communicating with each other over said networks.

9. The system of claim 8 whereby said transfer amount and said payee's account identifier is a code sent to payment processor to identify transaction and payee.

10. The system of claim 8 wherein said payment processor further includes computer readable instructions to perform the method after said authentication step is approved, said method comprising:

the payer's wireless communication device receiving from said payee least one of the following selected from a group consisting:

a receipt evidencing said transfer amount, digital goods and a receipt for services over a wireless network.

11. The system of claim 10 further comprising:

a point of sale terminal;

wherein said terminal having computer readable instructions to perform the method comprising:

receiving said receipt from said payer's wireless communication device to said terminal for verification; and if verified then receiving goods or services from said payee.

12. The system of claim 8 wherein the step of receiving at least a password from said payer, said payment processor having further computer readable instructions to perform the method comprising:

the payment processor establishing a connection with said payer over a second network different as compared to the first network; and whereby at least one of said networks is a wireless network.

13. The system of claim 8 further includes:

a prepaid card;

said payment processor having further computer readable instructions to perform the method comprising:

wherein the payer's telecommunication account is a prepaid account, includes a further step of verifying the availability of prepaid funds satisfying said amount.

14. The system of claim 8 wherein said telecommunication carrier provider's server having computer readable instructions to perform the method comprising establishing sub accounts having corresponding account identifier to the main telecommunication account by user.

15. A computer network method for payment or fund transfer transactions using telecommunication accounts through at least one telecommunication carrier provider and a wireless communication device comprising:

provinding at least a centralized payment processor linked to networks connecting to at least a telecommunication carrier provider's server having telecommunication accounts and corresponding account identifiers;

providing a wireless communication device;

the payment processor receiving at least a transfer amount, a payee's account identifier upon initiation of a transaction over a first network from payer;

the payment processor receiving at least a payer's account identifier from said payer;

the payment processor receiving at least a password from said payer;

the payment processor transmitting said payer's account identifier, said password and said amount to said payer's telecommunication carrier provider for authentication;

the payment processor transmitting said payee's account identifier to said payee's telecommunication carrier provider for authentication;

if said authentication are both approved, includes a further step by the payment processor transmitting to said payer's carrier provider to record a debit entry for said transfer amount in said payer's account and transmitting to said payee's carrier provider to record a credit entry for same for payee's account; and whereby said payment processor is a single point of contact to process transactions between payer and payee having accounts with different telecommunication carrier providers without said providers communicating with each other over said networks.

16. A method according to claim 15 whereby said transfer amount and said payee's account identifier is a code sent to payment processor to identify transaction and payee.

17. A method according to claim 15 wherein the step of receiving at least a password from said payer further includes the steps comprising:

the payment processor establishing a connection with said payer over a second network different as compared to the first network; and whereby at least one of said networks is a wireless network.

18. A method according to claim 15 further comprising:

providing a prepaid card; and wherein the payer's telecommunication account is a prepaid account, includes a further step of verifying the availability of prepaid funds satisfying said amount.

19. A method according to claim 15 further includes after said authentication step is approved, the method comprising:

the payer's wireless communication device receiving from payee at least one of the following selected from a group consisting:

a receipt evidencing said transfer amount, digital goods and a receipt for services over a wireless network.

20. A method according to claim 19 further includes the steps for receiving goods and services comprising providing on-site point of sale terminal;

receiving said receipt from said payer's wireless communication device to said terminal for verification; and if verified then receiving goods or services from said payee.

21. A method according to claim 15 further includes the step for user to establish sub account at said telecommunication carrier provider's server having corresponding account identifier to the main telecommunication account.

* * * * *